United States Patent
Wang et al.

(10) Patent No.: US 12,316,460 B2
(45) Date of Patent: May 27, 2025

(54) HARQ RETRANSMISSIONS FOR HARQ FEEDBACK

(71) Applicant: Nokia Technologies Oy, Espoo (FI)

(72) Inventors: Yonggang Wang, Shanghai (CN); Hua Chao, Shanghai (CN); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/851,150

(22) PCT Filed: Mar. 31, 2022

(86) PCT No.: PCT/CN2022/084446
§ 371 (c)(1),
(2) Date: Sep. 26, 2024

(87) PCT Pub. No.: WO2023/184354
PCT Pub. Date: Oct. 5, 2023

(65) Prior Publication Data
US 2025/0112734 A1    Apr. 3, 2025

(51) Int. Cl.
*H04W 28/04*    (2009.01)
*H04L 1/08*    (2006.01)
(Continued)

(52) U.S. Cl.
CPC .............. *H04L 1/1812* (2013.01); *H04L 1/08* (2013.01); *H04B 7/18513* (2013.01)

(58) Field of Classification Search
CPC ... H04W 28/04; H04W 72/04; H04W 72/042; H04W 88/08; H04L 5/0007; H04L 1/1812; H04L 1/08
(Continued)

(56) References Cited

U.S. PATENT DOCUMENTS

2007/0177630 A1  8/2007  Ranta et al.
2021/0288756 A1* 9/2021  Shrestha ............... H04L 1/1887
(Continued)

FOREIGN PATENT DOCUMENTS

CN    112204908 A  *  1/2021  ............... H04L 1/18
CN    113922929 A  *  1/2022  ........... H04L 1/1816

OTHER PUBLICATIONS

3GPP TSG RAN WG1 Meeting #88bis, Spokane, Washington, USA, Apr. 3-7, 2017, R1-1705441, Agenda Item: 8.1.3.3.2, Source: Inter Digital Communications, Title: Multibit HARQ feedback for NR. (Year: 2017).*

(Continued)

*Primary Examiner* — Peter G Solinsky
*Assistant Examiner* — Sanjay K Dewan
(74) *Attorney, Agent, or Firm* — Robert P. Michal, Esq.; Carter, DeLuca & Farrell LLP

(57) ABSTRACT

Example embodiments of the present disclosure relate to devices, methods, apparatuses and computer readable storage media for HARQ retransmission for HARQ feedback. In example embodiments, a first device receives, from a second device, hybrid automatic repeat request, HARQ, negative acknowledgement, NACK, feedback for a data unit in a HARQ process. Moreover, the first device retransmits, to the second device, the data unit in the HARQ process and at least one data unit in at least one subsequent HARQ process, regardless of receiving HARQ feedback for the at least one data unit in the at least one subsequent HARQ process.

1 Claim, 6 Drawing Sheets

(51) Int. Cl.
  *H04L 1/1812* (2023.01)
  *H04L 5/00* (2006.01)
  *H04W 72/04* (2023.01)
  *H04W 88/08* (2009.01)
  *H04B 7/185* (2006.01)

(58) Field of Classification Search
  USPC .......................................................... 370/329
  See application file for complete search history.

(56) References Cited

U.S. PATENT DOCUMENTS

| | | | |
|---|---|---|---|
| 2023/0189345 A1* | 6/2023 | Khoshkholgh Dashtaki | ............... H04B 7/1853 370/329 |
| 2023/0209386 A1* | 6/2023 | Khoshkholgh Dashtaki | ............... H04W 24/10 370/350 |
| 2023/0209647 A1* | 6/2023 | Khoshkholgh Dashtaki | ............... H04L 1/1822 |
| 2023/0284277 A1* | 9/2023 | Park | ................... H04W 74/006 370/329 |
| 2023/0344557 A1* | 10/2023 | Khoshkholgh Dashtaki | ............... H04L 1/1812 |

OTHER PUBLICATIONS

3GPP TSG RAN WG1 Meeting #98, Prague, Czech Republic, Aug. 26-30, 2019, R1-1909641, Agenda Item: 7.2.5.4, Source: MediaTek Inc., Title: Summary of 7.2.5.4 on more delay-tolerant re-transmission mechanisms in NR-NTN. (Year: 2019).*

Interdigital Communications. "Multi-bit HARQ feedback for NR" 3GPP TSG RAN WGJ Meeting #88bis RI-1705441, Apr. 7, 2017 (Apr. 7, 2017). the whole document.

Mediatek Inc. Summary of 7.2.5.4 on more delay-tolerant re-transmission mechanisms in NR-NTN 3GPP TSG RAN WGJ Meeting #98 RI-1909641, Aug. 30, 2019 (Aug. 30, 2019). the whole document.

International Search Report issued by the National Intellectual Property Administration, PRC acting as the International Searching Authority in relation to International Application No. PCT/CN2022/084446 dated Oct. 25, 2022 (3 pages).

Written Opinion of the International Searching Authority issued by the National Intellectual Property Administration, PRC acting as the International Searching Authority in relation to International Application No. PCT/CN2022/084446 dated Oct. 25, 2022 (4 pages).

* cited by examiner

HARQ RETRANSMISSIONS FOR HARQ FEEDBACK

CROSS-REFERENCE TO RELATED APPLICATIONS

This application is a national phase entry under 35 U.S.C. 371 of PCT International Application No. PCT/CN2022/084446 filed Mar. 31, 2022, the disclosure of this application is expressly incorporated herein by reference in its entirety.

FIELD

Example embodiments of the present disclosure generally relate to the field of communications, and in particular, to devices, methods, apparatuses and computer readable storage media for hybrid automatic repeat request (HARQ) retransmissions for HARQ feedback.

BACKGROUND

A non-terrestrial network (NTN) refers to a network or segment of networks using radio frequency (RF) resources on board a satellite or an Unmanned Aerial System (UAS) platform. In order to enable wide service coverage capabilities and reduced vulnerability of natural disasters, the NTN is expected to reinforce the 5G service reliability by providing service continuity for Machine to Machine (M2M)/Internet of Thing (IoT) devices or for passengers on board moving platforms (for example, passengers on vehicles, such as, aircrafts, ships, high speed trains and buses) or ensuring service availability anywhere especially for critical communications, such as future railway/maritime/aeronautical communications. However, the propagation delay in NTN may be an issue for certain scenarios requiring ultra-low latency. The ultra-long round trip time (RTT) will impact service throughput, service reliability, energy consumption and service continuity in handover. Therefore, among others open issues, how to improve transmission efficiency in the NTN by decreasing the impacts caused by the propagation delay is still an open issue be addressed.

SUMMARY

In general, example embodiments of the present disclosure provide devices, methods, apparatuses and computer readable storage media for HARQ retransmissions for HARQ feedback.

In a first aspect, a first device is provided which comprises at least one processor and at least one memory including computer program code. The at least one memory and the computer program code are configured to, with the at least one processor, cause the first device to receive, from a second device, hybrid automatic repeat request, HARQ, negative acknowledgement, NACK, feedback for a data unit in a HARQ process. Moreover, the first device is caused to retransmit, to the second device, the data unit in the HARQ process and at least one data unit in at least one subsequent HARQ process, regardless of receiving HARQ feedback for the at least one data unit in the at least one subsequent HARQ process.

In a second aspect, a second device is provided which comprises at least one processor and at least one memory including computer program code. The at least one memory and the computer program code are configured to, with the at least one processor, cause the second device to transmit, to a first device, hybrid automatic repeat request, HARQ, negative acknowledgement, NACK, feedback for a data unit in a HARQ process. Moreover, the second device is caused to receive, from the first device, a retransmission of the data unit in the HARQ process and at least one retransmission of at least one data unit in at least one subsequent HARQ process, without transmitting HARQ feedback for the at least one data unit in the at least one subsequent HARQ process.

In a third aspect, a method is provided. In the method, a first device receives, from a second device, hybrid automatic repeat request, HARQ, negative acknowledgement, NACK, feedback for a data unit in a HARQ process. Moreover, the first device retransmits, to the second device, the data unit in the HARQ process and at least one data unit in at least one subsequent HARQ process, regardless of receiving HARQ feedback for the at least one data unit in the at least one subsequent HARQ process.

In a fourth aspect, a method is provided. In the method, a second device transmits, to a first device, hybrid automatic repeat request, HARQ, negative acknowledgement, NACK, feedback for a data unit in a HARQ process. Moreover, the second device receives, from the first device, a retransmission of the data unit in the HARQ process and at least one retransmission of at least one data unit in at least one subsequent HARQ process, without transmitting HARQ feedback for the at least one data unit in the at least one subsequent HARQ process.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
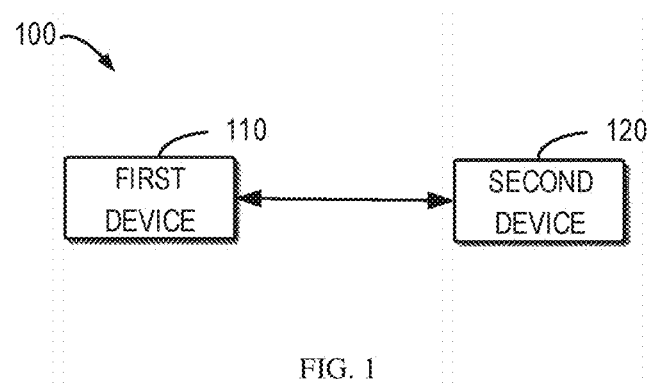
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device via which services can be provided to a terminal device in a communication network. For example, the network device may comprise a device on the satellite or UAS platform. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the user device include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

The existing HARQ processes are sequential operation with a "stop-and-wait" mechanism. For example, the gNB transmits to the UE one data unit in the HARQ process in one slot. Then, in a later slot, the gNB receives the HARQ feedback for the data unit. If the feedback is NACK, the gNB retransmits the PDU again, otherwise, if the feedback is acknowledgement (ACK), a new data unit is transmitted. Thus, in the stop-and-wait HARQ mechanism, the delay of adjacent data units of a given HARQ process is large. If the previous data unit needs to be retransmitted, the delay will multiply.

Especially, during the whole cycle of RTT in the Geostationary Earth Orbit (GEO) use case, the slots applied for data transmission are very sparse. For most of the time, HARQ process is in the state of waiting. Thus, the propagation delay in the NTN may be long, ranging from several milliseconds to hundreds of milliseconds depending on the satellite orbit. The following Table 1 shows propagation delays for the GEO satellite and Low Earth Orbiting (LEO) satellite for different situations.

TABLE 1 propagation delays for GEO satellite and LEO satellite

| | | LEO at 600 km | | LEO at 1500 km | | GEO at 35786 km | |
|---|---|---|---|---|---|---|---|
| Elevation angle | Path | Distance D (km) | Delay (ms) | Distance D (km) | Delay (ms) | Distance D (km) | Delay (ms) |
| UE: 10 | satellite - UE | 1932.24 | 6,440 | 3647.5 | 12,158 | 40586 | 135.286 |
| GW: 5 | satellite - gateway | 2329.01 | 7.763 | 4101.6 | 13.672 | 41126.6 | 137.088 |
| 90 | satellite - UE | 600 | 2 | 1500 | 5 | 35786 | 119.286 |
| Bent pipe satellite | | | | | | | |
| One way delay | Gateway-satellite_UE | 4261.2 | 14.204 | 7749.2 | 25.83 | 81712.6 | 272.375 |
| Round Trip Delay | Twice | 8522.5 | 28.408 | 15498.4 | 51.661 | 163425.3 | 544.751 |
| Regenerative satellite | | | | | | | |
| One way delay | Satellite -UE | 1932.24 | 6.44 | 3647.5 | 12.16 | 40586 | 135.286 |
| Round Trip Delay | Satellite-UE-Satellite | 3864.48 | 12.88 | 7295 | 24.32 | 81172 | 270.572 |

It can be seen that, when legacy HARQ processes are applied, the RTT is up to hundreds of milliseconds. Further, it is proposed to enable parallel multiple HARQ processes, which means that in a period, there are multiple HARQ processes dealing with the data transmission in parallel. In this case, the second process will transmit the data unit in the next slot and be independent to the first HARQ process. Although 32 HARQ processes are proposed to be supported in the NTN, it seems not enough for the GEO use case. So the longer propagation delays in NTN will greatly reduce the peak data rate of users.

In the third Generation Partnership Projection (3GPP) standardization, there are some discussions about solutions to avoid reduction in peak data rates in NTN. For example, one solution is to increase the number of HARQ processes to match the longer satellite round trip delay to avoid stop-and-wait in HARQ procedure. Another solution is to disable HARQ feedback to avoid stop-and-wait in HARQ procedure and rely on radio link control (RLC) automatic repeat request (ARQ) for reliability. For example, for the disabling downlink (DL) HARQ feedback, the DL blind retransmission can be supported. With the blind retransmission, the physical downlink share channel (PDSCH)/physical uplink share channel (PUSCH) (re-)transmissions of the same transmission block (TB) may be scheduled without waiting for the HARQ feedback. However, there is no need for all kinds of DL traffic to be guaranteed with such high reliability. The blind retransmission will cause unnecessary retransmission, thus increasing unnecessary power consumption.

Then, there are also some discussions about network scheduling strategy to avoid NTN UE in HARQ stalling state. For example, the network device may continuously schedule the UE using one or a combination of scheduling strategies, such as HARQ process without HARQ retransmissions, or HARQ process with blind retransmissions, or HARQ process with HARQ retransmissions based on HARQ feedback. Obviously, these three scheduling strategies in NTN can achieve different quality of service (QOS) in terms of reliability, latency and peak data rate at the cost of different resource consumption. For the HARQ process without HARQ retransmission, in order to achieve the target block error rate (BLER), the more conservative parameter settings, for example low MCS and high transmit power, may be needed for the first transmission. This strategy is too expensive at the cost of low spectrum efficiency because more UE power or radio resources would be consumed. For the HARQ process with blind retransmission scheduling, it may result in extra useless retransmission because all retransmissions are blindly scheduled. For the HARQ process with HARQ retransmission scheduling based on HARQ feedback, retransmission may be initiated only when decoding fails. In this case, the retransmission is a kind of on-demand scheduling, which would not waste radio resources because when the previous transmission is successful, the retransmission will not be initiated. But multiple retransmissions would cause longer latency, especially for GEO scenarios with long RTT.

Thus, there is a need to balance the different requirements between reliability, latency and peak data rate. Besides, by now, there is no effective way to decrease the impacts caused by the propagation delay to further improve communication efficiency.

Example embodiments of the present disclosure provide a scheme of HARQ retransmission for HARQ feedback. With the scheme, a device (referred to as a first device) receives, from another device (referred to as a second device), HARQ NACK feedback for a data unit in a HARQ process. Moreover, the first device retransmits, to the second device, the data unit in the HARQ process and at least one data unit in at least one subsequent HARQ process, regardless of receiving HARQ feedback for the at least one data unit in the at least one subsequent HARQ process.

This scheme improves transmission efficiency for the NTN flexibly and efficiently by decreasing the impacts caused by the propagation delay. As such, it is allowed to adapt to the changes of reliability and data rate due to the changes of wireless environment. This scheme can better support different types of traffic with varying of reliability, latency, and peak data rate requirements.

FIG. 1 shows an example environment 100 in which example embodiments of the present disclosure can be implemented.

The environment 100, which may be a part of a communication network, comprises two devices 110 and 120 communicating with each other or with other devices via each other. For the purpose of discussion, the devices 110 and 120 may be referred to as a first device 110 and a second device 120, respectively.

The first and second devices 110 and 120 may be implemented by any suitable devices in the communication network. In some example embodiments, the first device 110 may be implemented by a terminal device and the second device 120 may be implemented by a network device, or vice versa. In some other example embodiments, the first and second devices 110 and 120 may be both implemented by terminal devices or network devices.

It is to be understood that two devices are shown in the environment 100 only for the purpose of illustration, without suggesting any limitation to the scope of the present disclosure. In some example embodiments, the environment 100 may comprise a further device (referred to as a third device) to communicate with the first device 110 and the second device 120.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Figure 2:
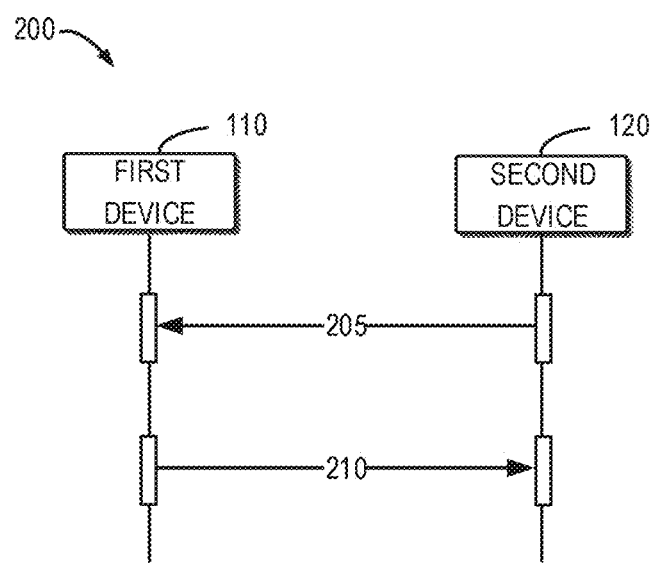
FIG. 2 illustrates a signaling flow between the first device and the second device according to some example embodiments of the present disclosure.

FIG. 2 shows a signaling flow 200 between the first device and the second device according to some example embodiments of the present disclosure. For the purpose of discussion, the signaling flow 200 will be described with reference to FIG. 1.

In some example embodiments, the first device 110 may comprise a network device, and the second device 120 may comprise a terminal device. In some other example embodiments, the first device 110 may comprise a terminal device, and the second device 120 may comprise a network device.

For example, the first device 110 may transmits a data unit in a HARQ process in a slot, and transmits one or more data units in one or more subsequent HARQ processes in the following slots. Accordingly, the second device 120 may receive from the first device 110 these data units.

As shown in FIG. 2, the second device 120 transmits (205), to the first device 110, HARQ NACK feedback for the data unit in the HARQ process. For example, if the second device 120 receives the data unit incorrectly, it may transmit to the first device 110 HARQ NACK feedback for the data unit.

In some example embodiments, the second device 120 may only transmit HARQ NACK feedback for the data unit in the HARQ process. Then, upon reception of the HARQ NACK feedback for the data unit in the HARQ process, the first device 110 may assume NACK feedback for at least one data unit in at least one subsequent HARQ process. Then, the first device 110 may determine that the data unit in the HARQ process and the at least one data unit in the at least one subsequent HARQ process need to be retransmitted.

In some example embodiments, if the second device 120 receives the data unit in the HARQ process incorrectly, it may assume that the at least one data unit in at least one subsequent HARQ process should be received incorrectly either. Then, the second device 120 may transmit, to the first device 110, the HARQ NACK feedback for the data unit in the HARQ process together with the assumed HARQ NACK feedback for the at least one data unit in the at least one subsequent HARQ process. Then, upon reception of the HARQ NACK feedback for the data unit in the HARQ process and the HARQ NACK feedback for the at least one data unit in the at least one subsequent HARQ process, the first device 110 may determine that the data unit in the HARQ process and the at least one data unit in the at least one subsequent HARQ process need to be retransmitted.

Then, the first device 110 retransmits (210), to the second device 120, the data unit in the HARQ process and the at least one data unit in the at least one subsequent HARQ process, regardless of receiving HARQ feedback for the at least one data unit in the at least one subsequent HARQ process.

In some example embodiments, if the first device 110 receives HARQ feedback for the at least one data unit in the at least one subsequent HARQ process during the retransmissions of the data unit in the HARQ process and the at least one data unit in the at least one subsequent HARQ process to the second device 120, it may ignore the HARQ feedback for the at least one data unit in the at least one subsequent HARQ process. Alternatively or in addition, the first device 110 may retransmit, to the second device 120, the data unit in the HARQ process and the at least one data unit in the at least one subsequent HARQ process, before receiving HARQ feedback for the at least one data unit in the at least one subsequent HARQ process.

In some example embodiments, the first device 110 may determine a window for the retransmissions of the HARQ process and the at least one subsequent HARQ process, and then, the first device 110 may retransmit, to the second device 120, the data unit in the HARQ process and the at least one data unit in the at least one subsequent HARQ process in the window for the retransmissions of the HARQ process and the at least one subsequent HARQ process. In this case, the window may restrict how many subsequent feedback-not-received HARQ process retransmit previous data units. For example, the window may be determined based on the balance between the peak data rate and traffic reliability.

In some example embodiments, a length of the window may comprise a time period for the retransmissions of the HARQ process and the at least one subsequent HARQ process. For example, a given number of slots may be indicated. The time period is related to the channel time correlation, and thus the subsequent processes in the period with the high channel correlation would need retransmission. In this case, the first device 110 may retransmit the data unit in the HARQ process and the at least one data unit in the at least one subsequent HARQ process in the time period for the retransmissions of the HARQ process and the at least one subsequent HARQ process.

Alternatively or in addition, the length of the window may comprise a number of the HARQ processes for the retransmissions of the HARQ process and the at least one subsequent HARQ process. In this case, the first device 110 may retransmit the data unit in the HARQ process and the at least one data unit in the at least one subsequent HARQ process within the number of the HARQ processes. For example, the number of the HARQ processes for the retransmissions may be any value less than the number of parallel HARQ processes. As an example, the number of retransmitted HARQ processes may be indicated dynamically, and may be determined based on the channel conditions, in one instance, the number of HARQ processes waiting for feedback of the first transmission in the window.

In some example embodiments, the first device 110 may determine the window itself. Then, the first device 110 may retransmit data units based on the determined window.

In some example embodiments, the first device 110 may receive, from the second device 120, an indication indicating the window for the retransmissions of the HARQ process and the at least one subsequent HARQ process. Then, the first device 110 may determine the window for the retransmissions based on the indication. For example, the indication may be pre-configured. Alternatively or in addition, the indication may be received together with the HARQ NACK feedback for the data unit in a feedback signaling. As an example, the feedback signaling may be control information carrying a feedback indicator.

In the embodiments where the first device 110 comprises a terminal device, and the second device 120 comprises a network device, the indication may comprise a downlink feedback indicator (DFI). In this case, the DFI may comprise a value (also referred to as a first value) to indicate a time period for the retransmissions of the HARQ process and the at least one subsequent HARQ process and/or a number of HARQ processes for the retransmissions of the HARQ process and the at least one subsequent HARQ process. As an example, the first value may be a negative value. For example, the DFI may also comprise another value (also referred to as a second device) to indicate a time period for at least one retransmission of at least one HARQ process ahead of the HARQ process; or a number of at least one HARQ process for the at least one retransmission of the at least one HARQ process ahead of the HARQ process. As an example, the second value may be a positive value. For example, the NACK feedback for the data units may be integrated in the DFI of DCI format 0_1, which also includes an indication of the minimum delay between the last symbol of a given PUSCH, and the first symbol of the PDCCH of the DFI. In this case, if the minimum delay is satisfied, the HARQ feedback for the given PUSCH may be considered to be valid, otherwise the HARQ feedback for the PUSCH may be ignored. The first device 110 may pick up the NACK feedback of the corresponding HARQ processes in the DFI. Then, the first device 110 may initiate the retransmission operation of the feedback-not-received data units in the granted resource when it receives the uplink scheduling grant.

Alternatively or in addition, the indication may be indicated in a radio resource control (RRC), media access control (MAC) control element (CE) or physical layer signaling.

In the example embodiments where the first device 110 comprises a network device and the second 120 comprises a terminal device, The DL physical channel resource may be allocated for the data unit in the HARQ process and the at least one data unit in the at least one subsequent HARQ process and the scheduling information may be carried in the PDCCH in a following slot.

In the example embodiments where the first device 110 comprises a network device and the second device 120 comprises a terminal device, the second device 120 may reset a timer for the reception. For example, in this case, to retain a wake-up state for retransmission, the second device 120 may monitor the PDCCH for downlink scheduling information in the following slot, in which the scheduling message of retransmitted data units is carried. Then, the second device 120 may reset the drx-InactivityTimer in the first symbol after the end of the PDCCH reception. For example, the second device 120 may deal with the reception and detection of the retransmitted feedback-not-received data units in parallel with combing for each HARQ process.

In the example embodiments where the first device 110 comprises a terminal device and the second 120 comprises a network device, the second device 120 may determine uplink scheduling for the retransmission. In these HARQ processes, the time from the last uplink scheduling grant may be less than one RTT. And then the corresponding UL physical channel resource may be allocated. For example, the determined uplink scheduling grant may be sent together with the HARQ NACK feedback.

Alternatively or in addition, if the second device 120 receives the data unit correctly, it may transmit HARQ ACK feedback for the data unit to the first device 110. In this case, the first device 110 may transmit new data unit in several following feedback-not-received HARQ processes to reduce the transmission latency and improve the peak data rate.

The scheme of the present disclosure may provide instantaneous retransmissions of several data units in the HARQ processes for which HARQ feedback has not yet been received, to reduce the delay caused by the stop-and-wait operation, guarantee successful transmission, and improve the peak data rate. Thus, it may facilitate especially NTN services where the reliability and low latency are equally important.

The scheme of instantaneous retransmissions of feedback-not-received data units in HARQ processes may balance the different requirements between the reliability, latency and peak data rate. And it may be flexibly configured to adapt to the changes of reliability and data rate due to the changes of wireless environment and traffic load. With the scheme, the number of retransmissions of feedback-not-received HARQ processes may be changed dynamically during the data transmission. For example, when the network side finds that the physical layer reliability requirement cannot be met and a large number of RLC layer retransmissions are caused, it may lower the number of (re) transmission of feedback-not-received HARQ processes.

Figure 3:
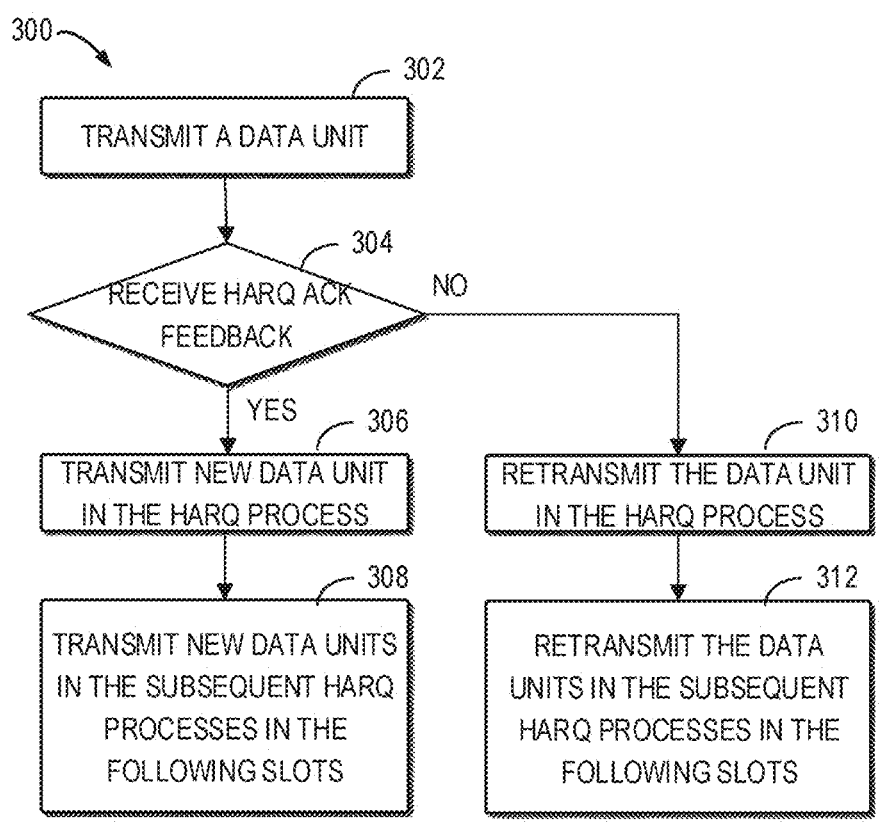
FIG. 3 illustrates an example process at the first device according to some example embodiments of the present disclosure.

FIG. 3 illustrates an example process at the first device according to some example embodiments of the present disclosure. For the purpose of discussion, the signaling flow 300 will be described with reference to FIG. 1.

As shown in FIG. 3, at 302, the first device 110 transmits a data unit in a HARQ process to the second device 120. Then, the first device 110 transmits a plurality of data units in subsequent HARQ processes to the second device 120. If the second device 120 fails to receive the data unit in the HARQ process correctly, the second device 120 may transmit HARQ feedback for the unit to the first device 110. For example, the first device 110 may determine a window for the retransmissions of the previous data units. The window may be determined similarly as described above with reference to FIG. 2. For the purpose of simplification, the details will be omitted.

If, at 304, the first device 110 receives HARQ ACK feedback for the data unit in the HARQ process, at 306, it transmits new data unit in the HARQ process to the second device 120. Then, at 308, the first device 110 transmits new data units in the subsequent HARQ processes to the second device 120 in the following slots.

Otherwise, if, at 304, the first device 110 receives HARQ NACK feedback for the data unit in the HARQ process, at 310, it retransmits the data unit in the HARQ process to the second device 120. Then, at 312, the first device 110 retransmits the data units in the subsequent HARQ processes in the window to the second device 120 in the following slots.

All operations and features as described above with reference to FIGS. 1-2 are likewise applicable to the process 300 and have similar effects. For the purpose of simplification, the details will be omitted.

Figure 4:
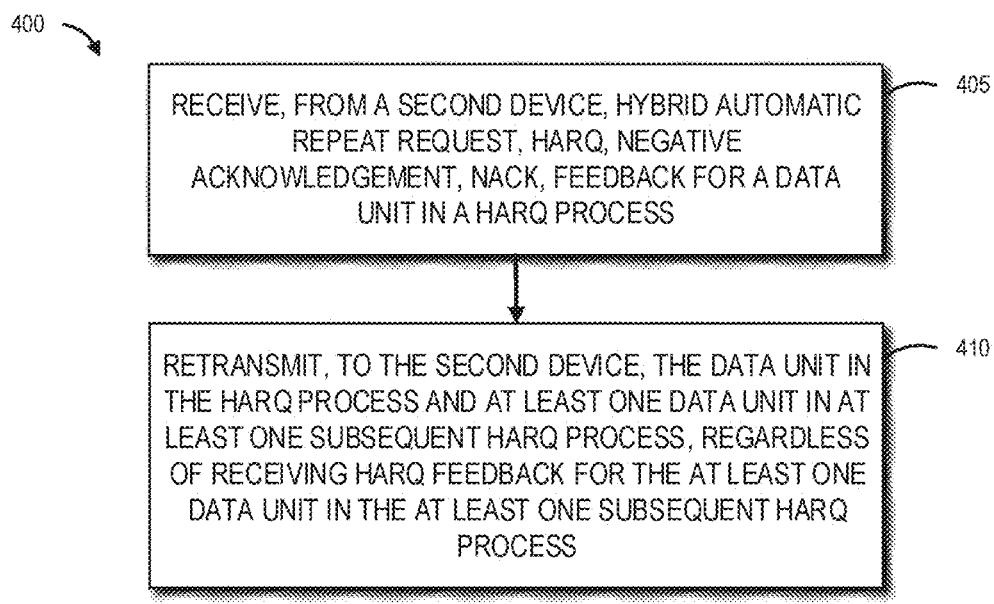
FIG. 4 illustrates a flowchart of an example method according to some example embodiments of the present disclosure.

FIG. 4 shows a flowchart of an example method 400 according to some example embodiments of the present disclosure. The method 400 can be implemented by the first device 110 as shown in FIG. 1. For the purpose of discussion, the method 400 will be described with reference to FIG. 1.

At block 405, the first device 110 receives, from the second device 120, hybrid automatic repeat request, HARQ, negative acknowledgement, NACK, feedback for a data unit in a HARQ process. At block 410, the first device 110 retransmits, to the second device 120, the data unit in the HARQ process and at least one data unit in at least one subsequent HARQ process, regardless of receiving HARQ feedback for the at least one data unit in the at least one subsequent HARQ process.

In some example embodiments, the first device 110 may receive, from the second device 120, an indication indicating a window for retransmissions of the HARQ process and the at least one subsequent HARQ process.

In some example embodiments, the first device 110 may retransmit, to the second device 120, the data unit in the HARQ process and the at least one data unit in the at least one subsequent HARQ process in the window for the retransmissions of the HARQ process and the at least one subsequent HARQ process according to the indication.

In some example embodiments, the indication may be received together with the HARQ NACK feedback for the data unit in a feedback signaling.

In some example embodiments, the feedback signaling may be control information carrying a feedback indicator.

In some example embodiments, the indication may be pre-configured.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device 110 may comprise a network device, and the second device 120 may comprise a terminal device.

In some example embodiments, the first device 110 may comprise a terminal device, and the second device 120 may comprise a network device.

In some example embodiments, the indication may comprise a downlink feedback indicator.

In some example embodiments, the downlink feedback indicator may comprise a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value may be a negative value.

In some example embodiments, the downlink feedback indicator may comprise a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value may be a positive value.

All operations and features as described above with reference to FIGS. 1-3 are likewise applicable to the method 400 and have similar effects. For the purpose of simplification, the details will be omitted.

Figure 5:
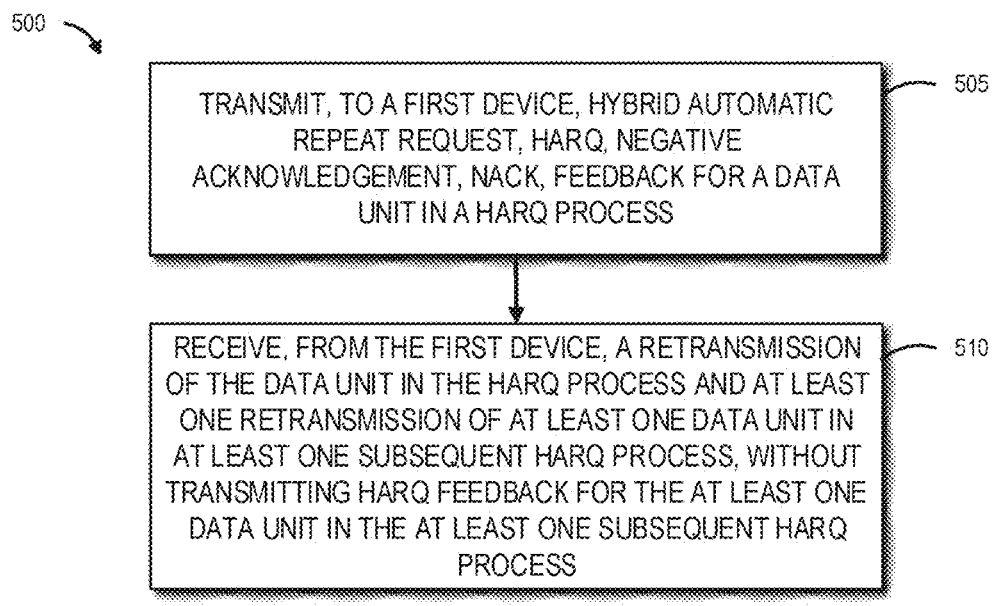
FIG. 5 illustrates a flowchart of an example method according to some other example embodiments of the present disclosure.

FIG. 5 shows a flowchart of an example method 500 according to some example embodiments of the present disclosure. The method 500 can be implemented by the second device 120 as shown in FIG. 1. For the purpose of discussion, the method 500 will be described with reference to FIG. 1.

At block 505, the second device 120 transmits, to the first device 110, hybrid automatic repeat request, HARQ, negative acknowledgement, NACK, feedback for a data unit in a HARQ process. At block 510, the second device 120 receives, from the first device 110, a retransmission of the data unit in the HARQ process and at least one retransmission of at least one data unit in at least one subsequent HARQ process, without transmitting HARQ feedback for the at least one data unit in the at least one subsequent HARQ process.

In some example embodiments, the second device 120 may transmit, to the first device 110, an indication indicating a window for retransmissions of the HARQ process and the at least one subsequent HARQ process.

In some example embodiments, the indication may be transmitted together with the HARQ NACK feedback for the data unit in a feedback signaling.

In some example embodiments, the feedback signaling may be control information carrying a feedback indicator.

In some example embodiments, a length of the window may comprise at least one of: a time period for the retransmissions of the HARQ process and the at least one subsequent HARQ process; and a number of the HARQ processes for the retransmissions of the HARQ process and the at least one subsequent HARQ process.

In some example embodiments, the indication may comprise a downlink feedback indicator.

In some example embodiments, the downlink feedback indicator may comprise a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value may be a negative value.

In some example embodiments, the downlink feedback indicator may comprise a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value may be a positive value.

In some example embodiments, the second device 120 may reset a timer for the reception of the data unit in the HARQ process and the at least one data unit in the at least one subsequent HARQ process.

In some example embodiments, the first device 110 may comprise a network device, and the second device 120 may comprise a terminal device.

In some example embodiments, the first device 110 may comprise a terminal device, and the second device 120 may comprise a network device.

All operations and features as described above with reference to FIGS. 1-4 are likewise applicable to the method 500 and have similar effects. For the purpose of simplification, the details will be omitted.

Figure 6:
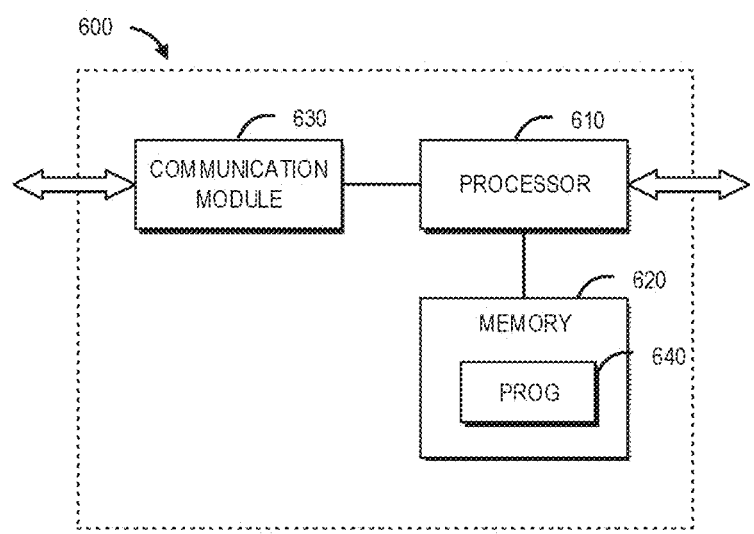
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 can be implemented at or as a part of the first device 110 or the second device 120 as shown in FIG. 1.

As shown, the device 600 includes a processor 610, a memory 620 coupled to the processor 610, a communication module 630 coupled to the processor 610, and a communication interface (not shown) coupled to the communication module 630. The memory 620 stores at least a program 640. The communication module 630 is for bidirectional communications, for example, via multiple antennas. The communication interface may represent any interface that is necessary for communication.

The program 640 is assumed to include program instructions that, when executed by the associated processor 610, enable the device 600 to operate in accordance with the example embodiments of the present disclosure, as discussed herein with reference to FIGS. 1-6. The example embodiments herein may be implemented by computer software executable by the processor 610 of the device 600, or by hardware, or by a combination of software and hardware. The processor 610 may be configured to implement various example embodiments of the present disclosure.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 620 is shown in the device 600, there may be several physically distinct memory modules in the device 600. The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

When the device 600 acts as the first device 110 or a part of the first device 110, the processor 610 and the communication module 630 may cooperate to implement the method 400 as described above with reference to FIG. 1. When the device 600 acts as the second device 120 or a part of the second device 120, the processor 610 and the communication module 630 may cooperate to implement the method 500 as described above with reference to FIG. 1. All operations and features as described above with reference to FIGS. 1-5 are likewise applicable to the device 600 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIG. 1. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a first device comprises: at least one processor; and at least one memory including computer program code; the at least one memory and the computer program code configured to, with the at least one processor, cause the first device to: receive, from a second device, hybrid automatic repeat request, HARQ, negative acknowledgement, NACK, feedback for a data unit in a HARQ process; retransmit, to the second device, the data unit in the HARQ process and at least one data unit in at least one subsequent HARQ process, regardless of receiving HARQ feedback for the at least one data unit in the at least one subsequent HARQ process.

In some example embodiments, the first device is further caused to: receive, from the second device, an indication indicating a window for retransmissions of the HARQ process and the at least one subsequent HARQ process.

In some example embodiments, the first device is further caused to: retransmit, to the second device 120, the data unit in the HARQ process and the at least one data unit in the at least one subsequent HARQ process in the window for the retransmissions of the HARQ process and the at least one subsequent HARQ process according to the indication.

In some example embodiments, the indication is received together with the HARQ NACK feedback for the data unit in a feedback signaling.

In some example embodiments, the feedback signaling comprises control information carrying a feedback indicator.

In some example embodiments, indication is pre-configured.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value

In some aspects, a second device comprises: at least one processor; and at least one memory including computer program code; the at least one memory and the computer program code configured to, with the at least one processor, cause the second device to: transmit, to a first device, hybrid automatic repeat request, HARQ, negative acknowledgement, NACK, feedback for a data unit in a HARQ process; and receive, from the first device, a retransmission of the data unit in the HARQ process and at least one retransmission of at least one data unit in at least one subsequent HARQ process, without transmitting HARQ feedback for the at least one data unit in the at least one subsequent HARQ process.

In some example embodiments, the second device is further caused to: transmit, to the first device, an indication indicating a window for retransmissions of the HARQ process and the at least one subsequent HARQ process.

In some example embodiments, the indication is transmitted together with the HARQ NACK feedback for the data unit in a feedback signaling.

In some example embodiments, the feedback signaling comprises control information carrying a feedback indicator.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value.

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value.

In some example embodiments, the second device is further caused to: reset a timer for the reception of the data unit in the HARQ process and the at least one data unit in the at least one subsequent HARQ process.

In some aspects, a method comprises: receiving, at a first device, from a second device, hybrid automatic repeat request, HARQ, negative acknowledgement, NACK, feedback for a data unit in a HARQ process; and retransmitting, at the first device, to the second device, the data unit in the HARQ process and at least one data unit in at least one subsequent HARQ process, regardless of receiving HARQ feedback for the at least one data unit in the at least one subsequent HARQ process.

In some example embodiments, the method further comprises: receiving, from the second device, an indication indicating a window for retransmissions of the HARQ process and the at least one subsequent HARQ process.

In some example embodiments, retransmitting the data unit in the HARQ process and the at least one data unit in the at least one subsequent HARQ process comprises: retransmitting, to the second device, the data unit in the HARQ process and the at least one data unit in the at least one subsequent HARQ process in the window for the retransmissions of the HARQ process and the at least one subsequent HARQ process according to the indication.

In some example embodiments, the indication is received together with the HARQ NACK feedback for the data unit in a feedback signaling.

In some example embodiments, the feedback signaling comprises control information carrying a feedback indicator.

In some example embodiments, the indication is pre-configured.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value.

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value.

In some aspects, a method comprises: transmitting, at a second device, to a first device, hybrid automatic repeat request, HARQ, negative acknowledgement, NACK, feedback for a data unit in a HARQ process; and receiving, at the second device, from the first device, a retransmission of the data unit in the HARQ process and at least one retransmission of at least one data unit in at least one subsequent HARQ process, without transmitting HARQ feedback for the at least one data unit in the at least one subsequent HARQ process.

In some example embodiments, the method further comprises: transmitting, to the first device, an indication indicating a window for retransmissions of the HARQ process and the at least one subsequent HARQ process.

In some example embodiments, the indication is transmitted together with the HARQ NACK feedback for the data unit in a feedback signaling.

In some example embodiments, the feedback signaling comprises control information carrying a feedback indicator.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value.

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value.

In some example embodiments, the method further comprises: resetting a timer for the reception of the data unit in the HARQ process and the at least one data unit in the at least one subsequent HARQ process.

In some aspects, an apparatus comprises: means for receiving, at a first device, from a second device, hybrid automatic repeat request, HARQ, negative acknowledgement, NACK, feedback for a data unit in a HARQ process; and means for retransmitting, at the first device, to the second device, the data unit in the HARQ process and at least one data unit in at least one subsequent HARQ process, regardless of receiving HARQ feedback for the at least one data unit in the at least one subsequent HARQ process.

In some example embodiments, the apparatus further comprises: means for receiving, from the second device, an indication indicating a window for retransmissions of the HARQ process and the at least one subsequent HARQ process.

In some example embodiments, the means for retransmitting the data unit in the HARQ process and the at least one data unit in the at least one subsequent HARQ process comprises: means for retransmitting, to the second device, the data unit in the HARQ process and the at least one data unit in the at least one subsequent HARQ process in the window for the retransmissions of the HARQ process and the at least one subsequent HARQ process according to the indication.

In some example embodiments, the indication is received together with the HARQ NACK feedback for the data unit in a feedback signaling.

In some example embodiments, the feedback signaling comprises control information carrying a feedback indicator.

In some example embodiments, the indication is pre-configured.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value.

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value.

In some aspects, an apparatus comprises: means for transmitting, at a second device, to a first device, hybrid automatic repeat request, HARQ, negative acknowledgement, NACK, feedback for a data unit in a HARQ process; and means for receiving, at the second device, from the first device, a retransmission of the data unit in the HARQ process and at least one retransmission of at least one data unit in at least one subsequent HARQ process, without transmitting HARQ feedback for the at least one data unit in the at least one subsequent HARQ process.

In some example embodiments, the apparatus further comprises: means for transmitting, to the first device, an indication indicating a window for retransmissions of the HARQ process and the at least one subsequent HARQ process.

In some example embodiments, the indication is transmitted together with the HARQ NACK feedback for the data unit in a feedback signaling.

In some example embodiments, the feedback signaling comprises control information carrying a feedback indicator.

In some example embodiments, a length of the window may comprise at least one of: a time period for the retransmissions of the HARQ process and the at least one subsequent HARQ process; and a number of HARQ processes for the retransmissions of the HARQ process and the at least one subsequent HARQ process.

In some example embodiments, the first device comprises a network device, and the second device comprises a terminal device.

In some example embodiments, the first device comprises a terminal device, and the second device comprises a network device.

In some example embodiments, the indication comprises a downlink feedback indicator.

In some example embodiments, the downlink feedback indicator comprises a first value to indicate at least one of: a time period for the retransmissions of the HARQ process and the at least one subsequent HARQ process after the HARQ process; or a number of HARQ processes for the retransmissions of the HARQ process and the at least one subsequent HARQ process after the HARQ process.

In some example embodiments, the first value is a negative value.

In some example embodiments, the downlink feedback indicator comprises a second value to indicate at least one of: a time period for at least one retransmission of at least one HARQ process ahead of the HARQ process; or a number of at least one HARQ process for the at least one retransmission of the at least one HARQ process ahead of the HARQ process.

In some example embodiments, the second value is a positive value.

In some example embodiments, the apparatus further comprises: means for resetting a timer for the reception of the data unit in the HARQ process and the at least one data unit in the at least one subsequent HARQ process.

In some aspects, a computer readable storage medium comprises program instructions stored thereon, the instructions, when executed by a processor of a device, causing the device to perform the method according to some example embodiments of the present disclosure.

We claim:

1. A first user equipment, comprising:
 at least one processor; and
 at least one memory including computer program code;
 the at least one memory and the computer program code configured to, with the at least one processor, cause the first user equipment to:
  receive, from a base station, hybrid automatic repeat request, HARQ, negative acknowledgement, NACK, feedback for a transport block in a HARQ process; and
  retransmit, to the base station, the transport block in the HARQ process and at least one transport block in at least one subsequent HARQ process, regardless of receiving HARQ feedback for the at least one transport block in the at least one subsequent HARQ process, wherein the first user equipment is caused to retransmit the transport block in the HARQ process and the at least one transport block in the at least one subsequent HARQ process by:

retransmitting, to the base station, the transport block in the HARQ process and the at least one transport block in the at least one subsequent HARQ process in a window for the retransmissions of the HARQ process and the at least one subsequent HARQ process according to an indication indicating the window for retransmissions of the HARQ process and the at least one subsequent HARQ process, wherein a length of the window comprises at least one of:
  a time period for the retransmissions of the HARQ process and the at least one subsequent HARQ process, or
  a number of HARQ processes for the retransmissions of the HARQ process and the at least one subsequent HARQ process, wherein the first user equipment receives the indication from the base station, wherein the indication is pre-configured,
wherein the indication comprises a downlink feedback indicator,
wherein the downlink feedback indicator comprises a first value to indicate at least one of:
  a time period for the retransmissions of the HARQ process and the at least one subsequent HARQ process after the HARQ process, or
  a number of HARQ processes for the retransmissions of the HARQ process and the at least one subsequent HARQ process after the HARQ process,
wherein the first value is a negative value,
wherein the downlink feedback indicator comprises a second value to indicate at least one of:
  a time period for at least one retransmission of at least one HARQ process ahead of the HARQ process, or
  a number of at least one HARQ process for the at least one retransmission of the at least one HARQ process ahead of the HARQ process,
wherein the second value is a positive value,
wherein the indication is received together with the HARQ NACK feedback for the transport block in a feedback signaling,
wherein the feedback signaling comprises control information carrying a feedback indicator.

* * * * *